United States Patent [19]

Saito et al.

[11] Patent Number: 5,526,859
[45] Date of Patent: Jun. 18, 1996

[54] RADIAL TIRES INCLUDING SHORT FIBERS

[75] Inventors: Yuichi Saito, Kobe; Naohiko Kikuchi, Akashi, both of Japan

[73] Assignee: Sumitomo Rubber Industries, Ltd., Hyogo-ken, Japan

[21] Appl. No.: 165,594

[22] Filed: Dec. 13, 1993

[30] Foreign Application Priority Data

Dec. 14, 1992 [JP] Japan .................. 4-333272

[51] Int. Cl.$^6$ .............. B60C 1/00; B60C 11/00; B60C 13/00; B60C 15/06
[52] U.S. Cl. ............ 152/209 R; 152/458; 152/525; 152/532; 152/547
[58] Field of Search .............. 152/209 R, 209 D, 152/458, 525, 541, 547, 532, 539

[56] References Cited

U.S. PATENT DOCUMENTS

| | | | |
|---|---|---|---|
| 3,057,389 | 10/1962 | Dubetz et al. .................. | 152/458 |
| 3,658,108 | 4/1972 | Marzocchi et al. . | |
| 3,763,912 | 10/1973 | Bergomi et al. ................ | 152/458 |
| 3,837,986 | 9/1974 | Görter et al. .................. | 152/458 |
| 3,841,378 | 10/1974 | Hamacher et al. ............. | 152/362 R |
| 4,067,373 | 1/1978 | Delobelle et al. .............. | 152/354 R |
| 4,274,462 | 6/1981 | Ogawa et al. .................. | 152/209 R |
| 4,328,133 | 5/1982 | Ogawa et al. .................. | 152/548 |
| 4,711,285 | 12/1987 | Ogawa et al. .................. | 152/547 |
| 4,946,887 | 8/1990 | Takino et al. .................. | 152/209 R |
| 5,049,610 | 9/1991 | Takaki et al. .................. | 152/547 |
| 5,173,136 | 12/1992 | Agarwal et al. ................ | 152/458 |

FOREIGN PATENT DOCUMENTS

| | | | |
|---|---|---|---|
| 0000458 | 1/1979 | European Pat. Off. . | |
| 0461329 | 12/1991 | European Pat. Off. ........... | 152/525 |
| 2154535 | 5/1973 | France . | |
| 104405 | 6/1982 | Japan . | |
| 0153606 | 9/1984 | Japan ........................... | 152/458 |
| 207835 | 8/1988 | Japan . | |
| 1-145205 | 6/1989 | Japan ........................... | 152/209 R |
| 2-022348 | 1/1990 | Japan ........................... | 152/209 R |
| 143104 | 5/1992 | Japan . | |
| 191105 | 7/1992 | Japan . | |
| 4-274908 | 9/1992 | Japan ........................... | 152/525 |

OTHER PUBLICATIONS

"Carbon Black"; Jean-Baptiste Donnet; 1976; pp. 74–76.
Patent Abstracts of Japan, vol. 14, No. 228 (M–9073) 15 May 1990, & JP–A–02 057 410.
Patent Abstracts of Japan, vol. 16, No. 422 (M–1305) 4 Sep. 1992 & JP–A–04 143 104.

Primary Examiner—Steven D. Maki
Attorney, Agent, or Firm—Birch, Stewart, Kolasch & Birch

[57] ABSTRACT

Cap tread has a tan δ peak temperature of not less than −30° C. Base tread comprises not less than 30 parts of a carbon black having an iodine adsorption number of 30 to 90 mg/g and not less than 10 parts of a short fiber oriented in the axial direction. Side wall comprises not more than 30 parts of the carbon black and not less than 10 parts by weight of the short fiber oriented in the peripheral direction. Bead apex comprises not less than 65 parts by weight of a carbon black which has an iodine adsorption number of 60 to 100 mg/g and not less than 20 parts by weight of the short fiber oriented in the axial direction or a direction which crosses the axial direction. This radial tire is light and has a low energy loss, and can provide an excellent steering stability.

2 Claims, 3 Drawing Sheets

RADIAL DIRECTION

PERIPHERAL DIRECTION ial tire according to the present invention is a tire having features in a cap tread, a base tread, a side wall and a bead apex.

RADIAL TIRES INCLUDING SHORT FIBERS

BACKGROUND OF THE INVENTION

The present invention relates to a radial tire, more specifically, a radial tire which can save fuel consumption of a car.

Recently, global scale environmental problems such as ozone layer depletion, acid rain and greenhouse effect of the earth, come into question. These problems mostly derive from components in exhaust gases produced in combustion of car fuels such as gasoline. Therefore, reducing the combustion amount of car fuels can be one effective resolution against these problems.

Accordingly, in North America, laws concerning fuel consumption such as Gas Guzzler Tax and Company Average Fuel Economy (CAFE), for example, are under consideration. As technical developments according to CAFE, there are studied improvement of efficiency of an engine or the like, lowering of the energy loss of each part of a car, lowering of the weight of a car, and the like. With respect to a tire, the above-mentioned problems can be resolved by accomplishing, at the same time, lowering of energy loss in a tire and lowering of weight of a tire.

In order to lower the energy loss of a tire, several approaches are employed. For Example, a tan δ peak temperature of a cap tread is lowered (Approach ①-1). When the tan δ peak temperature of a cap tread is lowered, however, wet-grip of the cap tread tends to be lowered. Also, for the same purpose, a carbon black content of the cap tread is lowered (Approach ①-2). When the carbon black content is lowered, however, the wet grip and the dry grip tend to be lowered and the abrasion resistance also tends to be lowered. Further, a cap/base-structure is adopted for a tread and a carbon black content of a base tread rubber is lowered (Approach ②). When the carbon black content of a base tread rubber is lowered, however, the rigidity of the base tread tends to be lowered to make the steering stability worse. Still further, in order to lower the energy loss of a side wall rubber, a carbon black content of the side wall rubber is lowered (Approach ③). When the carbon black content of the side wall rubber is lowered, however, the rigidity of the side wall tends to be lowered to make the steering stability of a car worse.

In order to lower a weight of a tire, a groove depth of a cap tread is made shallow (Approach ④). When the groove depth is made shallow, however, the tire life tends to be shorten. Also, for the same purpose, the thickness of a side wall is made small (Approach ⑤). When the thickness of a side wall is made small, however, the ridigity of a tire tends to be deficient to make the steering stability worse. Further, to lower the weight of a tire, the volume of a bead apex is made small (Approach ⑥). When the volume of the bead apex is made small, however, the steering stability of a car tends to be worse.

Further, by combining the Approaches ①-1, ②-2 to ⑥, a tire which has a low energy loss and a low weight is obtained to realize the lowering of fuel consumption of a car. However, the obtained tire is inferior in steering stability such as grip characteristic and handle responsibility.

Also, there is proposed a tire which contains a short fiber in each component such as a base tread, a side wall or a bead filler for improving the steering stability of a car (JP-A-204637/1984, JP-A-204638/1984, JP-A-25605/1986, JP-A-263104/1988). However, the tire cannot realize the lowering of energy loss and the lowering of weight.

The present invention has been accomplished to solve the above problems, and provides a radial tire which has a low energy loss, has a low weight and realize excellent steering stability for a car.

SUMMARY OF THE INVENTION

The above problems can be solved by a radial tire comprising (A) a cap tread comprising a rubber composition which has a tan δ peak temperature measured after vulcanization of not lower than −30° C., (B) a base tread comprising a rubber composition containing, per 100 parts (part by weight, hereinafter the same) of a rubber component, not more than 30 parts of a carbon black which has an iodine adsorption number of from 30 to 90 mg/g, and not less than 10 parts of a short fiber, the short fiber being oriented in the substantially axial direction (hereinafter referred to as "axial direction") of the tire, (C) a side wall comprising a rubber composition containing, per 100 parts of a rubber component, not more than 30 parts of a carbon black which has an iodine adsorption number of from 30 to 90 mg/g and not less than 10 parts of a short fiber, the short fiber being oriented in the peripheral direction of the tire, and (D) a bead apex comprising a rubber composition containing, per 100 parts of a rubber component, not less than 65 parts of a carbon black which has an iodine adsorption number of from 60 to 100 mg/g and not less than 20 parts of a short fiber, the short fiber being oriented in the axial direction of the tire or a direction which crosses the axial direction.

DETAILED DESCRIPTION OF THE INVENTION

The radial tire according to the present invention is a tire having features in a cap tread, a base tread, a side wall and a bead apex.

CAP TREAD

The cap tread of the radial tire according to the present invention comprising a rubber composition having a tan δ peak temperature measured after vulcanization of not lower than −30° C., preferably from −30° C. to −10° C. Balance between the rolling resistance and the wet grip varies depending the tan δ peak temperature. When the tan δ peak temperature is lower than −30° C., the rolling resistance tends to small while the wet grip tends to be worse.

Though a rubber component of the rubber composition is not particularly limited, a solution-polymerized SBR is preferable because of its nature which lowers the rolling resistance and improves the wet grip. The rubber composition usually contains, per 100 parts of a rubber component, 40 to 80 parts of a carbon black, 1 to 40 parts of an oil, 1 to 3 parts of a wax, 1 to 3 parts of a rubber antioxidant, 1 to 3 parts of sulfur, 1 to 2 parts of an accelerator. There are employed standard blends directed to an excellent grip characteristic, a low rolling resistance and the like.

A thickness of the cap tread is usually 5 to 9 mm.

BASE TREAD

The rubber composition of the base tread of the tire according to the present invention contains, per 100 parts of a rubber component, not more than 30 parts, preferably 5 to 30 parts of a carbon black having an iodine adsorption number of from 30 to 90 mg/g, preferably from 30 to 70 mg/g. When the iodine adsorption number is lower than 30 mg/g, the steering stability of a car tends to be worse. When more than 90 mg/g, the rolling resistance tends to be worse (increase). When the carbon black content is more than 30 parts, the rolling resistance tends to be worse.

Figure 1:
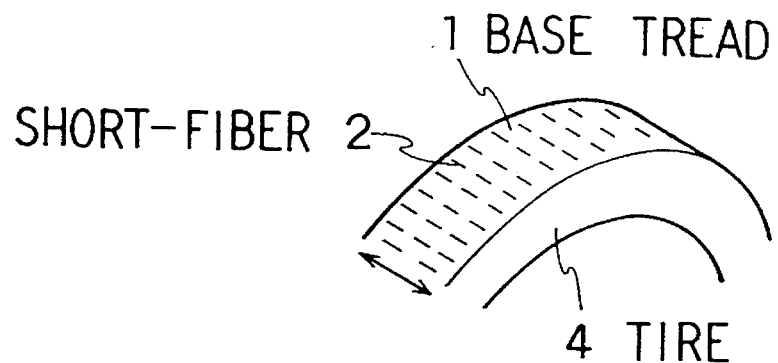
FIG. 1 is a schematic perspective view showing short fibers being oriented in a base tread in the axial direction of a tire.

The rubber composition of the base tread of the tire according to the present invention further contains, per 100 parts of a rubber component, not less than 10 parts, preferably 10 to 30 parts of a short fiber. As shown in FIG. 1, the short fiber 2 is oriented in a base tread 1 in the axial direction of a tire 4. Here, "the axial direction" means a direction crossing the peripheral direction of the tire at substantially right angle. When the short fiber content is lower than 10 parts, there is a tendency that modulus of elasticity in the axial direction is lowered and the transverse rigidity is lowered to make the steering stability of a car worse and to make the rolling resistance higher. When the orienting direction of the short fiber is a direction which is not the axial direction of the tire, for example, the peripheral direction of the tire, the steering stability of a car and the rolling resistance are not improved. As the short fiber, a short fiber grafted into natural rubber, such as UBEPOL-HE 0100 (available from UBE Industries, Ltd.), i.e. 6-nylon having an average diameter of 0.3 μm and an average length of 300 μm, can be used.

The rubber composition of the base tread of the tire according to the invention usually contains, per 100 parts of a rubber component, not more than 30 parts of the carbon blacks in total (a carbon black having an iodine adsorption number of outside the range from 30 to 90 mg/g may be included), 0 to 10 parts of an oil, 0 to 2 parts of a wax, 0 to 3 parts of a rubber antioxidant, 1 to 3 parts of sulfur and 1 to 2 parts of an accelerator.

A thickness of the base tread is usually approximately 1 to 5 mm. Total thickness of the base tread and the cap tread is usually approximately 10 mm.

The base tread used in the present invention can be manufactured, for example, by the following method.

Manufacturing method 1 of base tread

Figure 3:
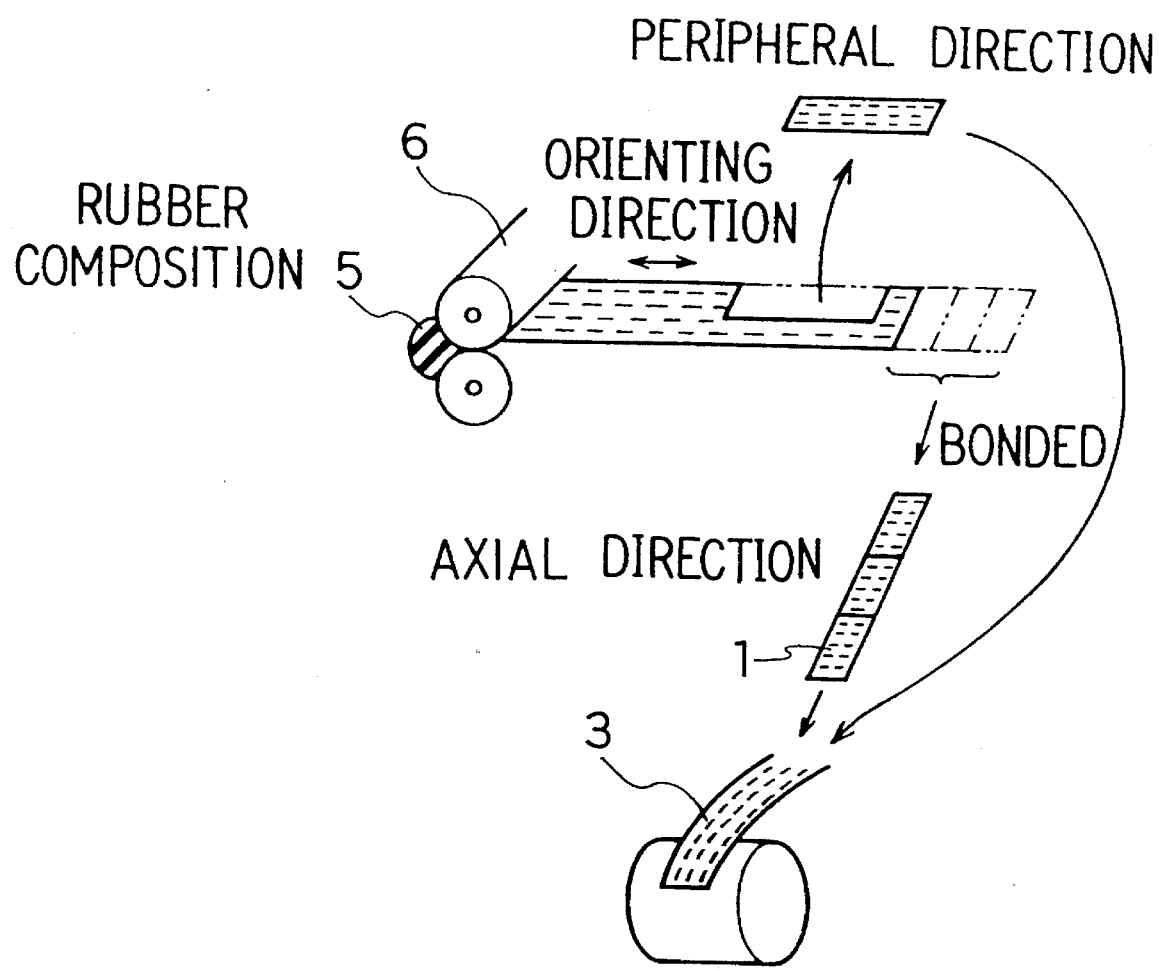
FIG. 3 is a flow chart showing a manufacturing process for a base tread and a side wall.
Figure 4:
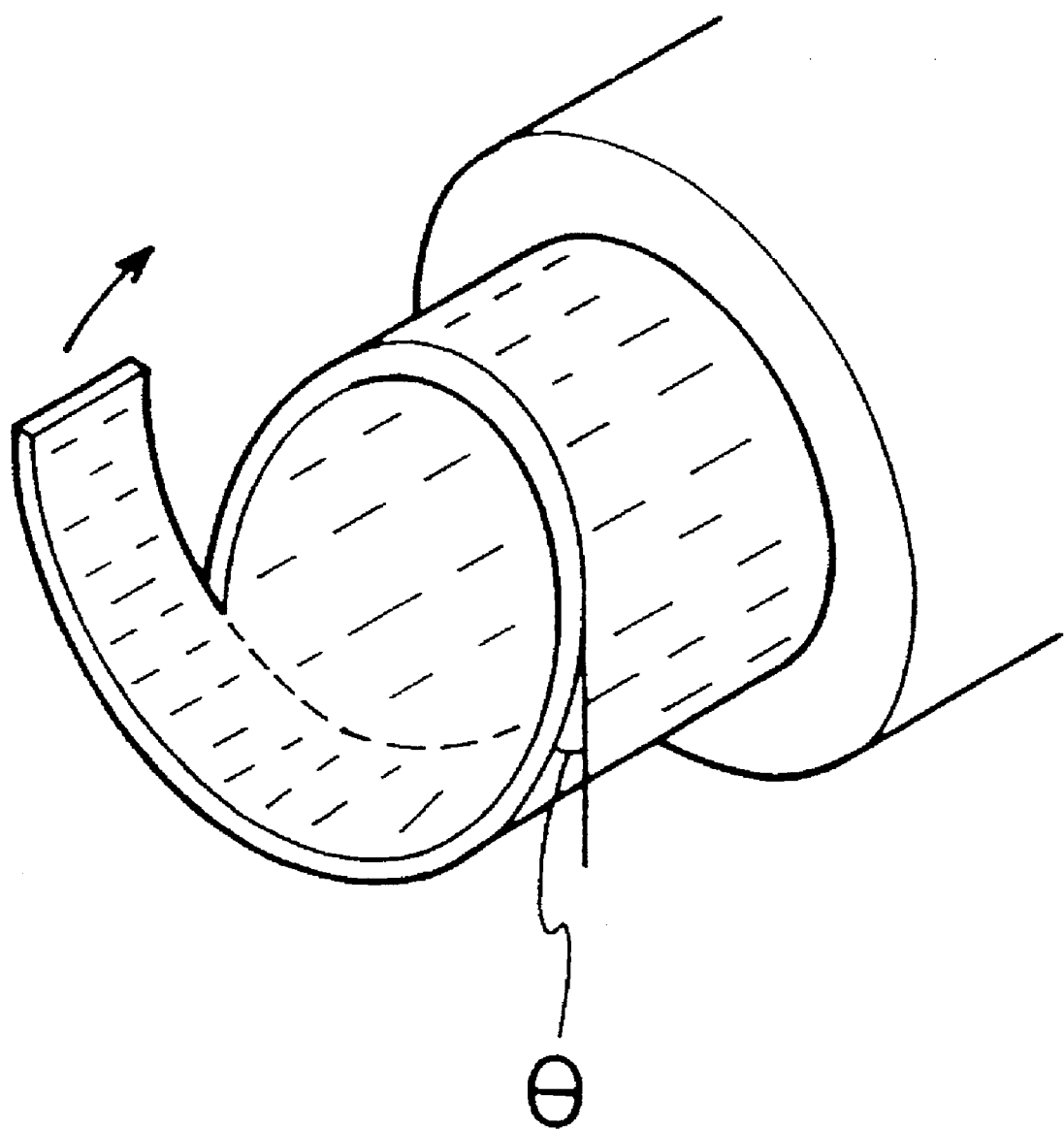
FIG. 4 is a schematic perspective view showing a method for cutting out a base tread from a tubular extruded article.

A mixture of the rubber component, the carbon black, the short fiber and the other additives is kneaded with a banbury mixer to prepare a rubber composition for a base tread. This rubber composition 5 is rolled with a calender roll 6 to make a sheet having a thickness of 1 to 6 mm as shown in FIG. 3. When the fiber is oriented to the axial direction, sheet pieces each having longitudinal direction which is right angle direction with respect to the rolling direction, are cut out and joined to a prescribed length to make a base tread as shown in FIG. 3.

Manufacturing method 2 of base tread

The same rubber composition for a base tread as prepared in Manufacturing method 1, is extruded with an extruder to obtain a tube. In this process, the short fiber is oriented in a direction which is parallel to the longitudinal direction of the tube. A sheet piece is cut out from the tube in a spiral manner at a prescribed angle θ (with respect to the perpendicular direction to the axis of the tube) to obtain a base tread. If the diameter of the tube is long enough and consequently the cutting angle θ is so small, the obtained base tread is one in which the short fiber is oriented in the axial direction.

SIDE WALL

The rubber composition of the side wall of the tire according to the present invention contains, per 100 parts of a rubber component, not more than 30 parts, preferably 10 to 30 parts of a carbon black having an iodine adsorption number of from 30 to 90 mm/g, preferably from 30 to 70 mg/g. When the iodine adsorption number is lower than 30 mg/g, the steering stability of a car tends to be worse. When more than 90 mg/g, the rolling resistance tends to be worse (increase). When the carbon black content is more than 30 parts, the rolling resistance tends to increase.

Figure 2:
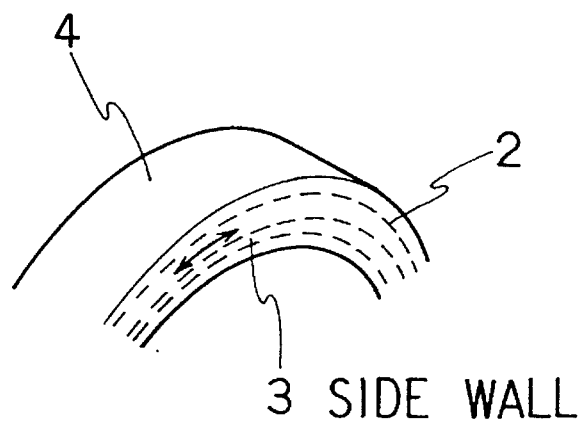
FIG. 2 is a schematic perspective view showing short fibers being oriented in a side wall in the peripheral direction of a tire.

The rubber composition of the side wall of the tire according to the present invention further contains, per 100 parts of a rubber component, not less than 10 parts, preferably 10 to 30 parts of a short fiber. As shown in FIG. 2, the short fiber 2 is oriented in a side wall 3 in the peripheral direction of a tire 4. When the short fiber content is lower than 10 parts, the steering stability tends to be worse. When the orienting direction of the short fiber is a direction which is not the peripheral direction of the tire, for example, the axial direction of the tire, the steering stability of a car is not improved. As the short fiber, the above-described UBEPOL-HE 0100 (available from UBE Industries, Ltd.) or the like can be used.

The rubber composition of the side wall of the tire according to the present invention usually contains, per 100 parts of a rubber component, not more than 30 parts of carbon blacks in total (a carbon black having an iodine adsorption number of outside the range from 30 to 90 mg/g may be included), 0 to 10 parts of an oil, 1 to 3 parts of a wax, 2 to 5 parts of a rubber antioxidant, 1 to 3 parts of sulfur and 1 to 2 parts of an accelerator.

A thickness of the side wall is usually approximately 1 to 5 mm.

A sheet piece having the longitudinal direction which is the rolling direction and having a prescribed length can be cut out in the same manner as in Manufacturing method 1 of base tread to obtain a side wall as shown in FIG. 3. Also, the side wall can be manufactured by using an extruder in usual manner. The side wall is preferably manufactured by ORBI method. The ORBI method is that, by using an extruder, an extrudate in the form of string is wound on the side wall region. The ORBI method is a preferable method, because no separation in joint parts occurs since there is no joint, and the side wall is formed uniformly on its peripheral. In a conventional method in which a side wall is extruded as one body and inflated, for example, green-strength in the peripheral direction is high and, consequently, the joint parts separate in the inflation step.

BEAD APEX

The rubber composition of the bead apex of the tire according to the present invention contains, per 100 parts of a rubber component, not less than 65 parts, preferably 65 to 100 parts of a carbon black having an iodine adsorption number of from 60 to 100 mg/g, preferably from 60 to 90 mg/g. When the iodine adsorption number is lower than 60 mg/g, the steering stability of a car tends to be worse. When more than 100 mg/g, the extrusion tends to be difficult. When the carbon black content is less than 65 parts, the steering stability tends to be worse.

The rubber composition of the bead apex of the tire according to the present invention further contains, per 100 parts of a rubber component, not less than 20 parts, preferably 20 to 50 parts of a short fiber. The short fiber is oriented in the bead apex in the axial direction of a tire or a direction which crosses the axial direction of a tire. Here, "a direction which crosses the axial direction" means a direction where the crossing angle with respect to the axial direction is ±30° to 60°, preferably ±45°. When the short fiber content is lower than 20 parts, the steering stability of a car tends to be worse. When the orienting direction of the short fiber is a direction which is neither the axial direction of the tire nor a direction which crosses the axial direction, for example, the peripheral direction of the tire, the steering stability of a car is not improved. As the short fiber, the above-mentioned UBEPOL-HE 0100 (available from UBE inductries, Ltd.) or the like can be used.

The rubber composition of the bead apex of the tire according to the invention usually contains, per 100 parts of a rubber component, 50 to 80 parts of carbon blacks in total (a carbon black having an iodine adsorption number of outside the range from 30 to 100 mg/g may be included), 0 to 5 parts of an oil, 0 to 2 parts of a wax, 0 to 3 parts of a rubber antioxidant, 2 to 6 parts of sulfur and 2 to 5 parts of an accelerator.

A height of the bead apex is usually approximately 10 to 70 mm.

The radial tire according to the present invention is produced in conventional production process. First, an unvulcanized rubber is obtained by blending and kneading. Then, a green tire is formed from the unvulcanized rubber, by using processes such as calendering, topping and extrusion. Subsequently, the green tire is vulcanized to provide the radial tire.

The radial tire according to the present invention is especially suitable for a passenger car and a commercial vehicle.

The present invention is more specifically described and explained by means of the following Production Examples and Examples. The present invention, however, is not limited to the Examples. Testing methods and description formulae of the results in the Production Examples and the Examples are listed below.

Rolling resistance

Rolling resistance is measured by using a uniaxial drum tester under the conditions of an inner pressure of a tire set at 2.5 kgf, a load set at 350 kgf and a speed per hour set at 80 km/h. The result is described in terms of a relative value (index) to "100" of the reference tire. When the index is low, the rolling resistance is excellent.

Steering responsibility and Grip characteristic (Steering stability)

Four tires to be tested are attached to four wheels of a domestic 1600 cc FF passenger car, and the steering stability of the car is evaluated on Okayama Test Course owned by Sumitomo Rubber Industries, Ltd. The steering responsibility is represented by a responsibility of a car to steering operation when running straight. The grip characteristic is represented by a boundary speed or behavior when a car begins to slide by centrifugal force during cornering operation. Each result is classified to five stages and is shown in terms of a relative point to "3" of a reference tire. The larger the point, the better. In tables, "+" mark attached to the right shoulder of a figure means being somewhat superior.

Wet brake

Four tires to be tested are attached to four wheels of the same passenger car as used in the steering stability test. Water is sprinkled over the asphalt road surface of the above-mentioned Okayama Test Course. The car runs on the asphalt road at 40 km/h, and then the brake stopping distance is measured. The wet brake μ is calculated according to the following equation:

$$\mu = \frac{v^2}{2gl}$$

v=initial speed
g=gravitational acceleration
l=brake stopping distance.

Result is shown in terms of a relative value (index) to "100" of a reference tire. The larger the index, the better.

Ride comfort

Four tires to be tested are attached to four wheels of the same passenger car as used in the steering stability test. The shock feeling, dumping and hardness feeling are evaluated on various road surfaces (stone pavement road, uneven road, mended road) of the above-mentioned Okayama Test Course. The result is shown in the same manner as in the steering stability test.

The compositions of the components other than the characteristic components prepared in Production Examples are shown in Table 1.

TABLE 1

|  | Cap-tread | Base-tread | Side-wall | Bead-apex |
| --- | --- | --- | --- | --- |
| NR | 40 | 60 | 45 | 100 |
| BR | — | 40 | 55 | — |
| SBR*[1] | 30 | — | — | — |
| SBR*[2] | 30 | — | — | — |
| FEF | — | — | 40 | — |
| N-351 | 45 | — | — | — |
| HAF | — | 35 | — | 70 |
| Thermosetting resin*[3] | — | — | — | 15 |
| Aromatic oil | — | 5 | 5 | — |
| Phenol resin | — | 3 | — | 3 |
| Wax | 1.5 | 1.5 | 2 | — |
| Rubber anti-oxidant 6PPD | 1.5 | 2 | 3 | — |
| Stearic acid | 2 | 2 | 2 | 2 |
| Zinc oxide | 3 | 4 | 3 | 5 |
| Sulfur | 1.75 | 2 | 1.5 | 3 |
| Accelerator CZ | 1.0 | 1.3 | 1 | 3.8 |
| Retarder PVI | — | — | — | 0.4 |

*[1]Solution-polymerized SBR: Bonded styrene content is 15% by weight, vinyl content is 57% by mole.
*[2]Solution-polymerized SBR: Bonded styrene content is 15% by weight, vinyl content is 45% by mole.
*[3]PR12686 resin

PRODUCTION EXAMPLE 1

Cap tread

A cap tread rubber composition is prepared by kneading a mixture of 60 parts of a solution-polymerized styrene-butadiene rubber (SBR) (bonded styrene content is 15% by weight, vinyl content is 30% by mole), 40 parts of natural rubber (NR), 60 parts of N351 (carbon black), 25 parts of an aromatic oil, 1.5 parts of a wax, 1.5 parts of rubber antioxidant 6PPD, 2 parts of stearic acid, 3 parts of zinc oxide, 1.75 parts of sulfur and 1.5 parts of accelerator CZ, with a banbury mixer. Also, a base tread rubber composition is prepared using the composition described in Table 1. These rubber compositions are co-extruded so that an upper layer is the cap tread composition and a lower layer is the base tread composition, to obtain a tread of cap tread/base tread 2-layer structure. Using this tread and side walls and bead apexes of which respective compositions are shown in Table 1, forming and vulcanization are carried out to obtain a radial tire A (185/65 R14). The radial tire corresponds to DUNLOP SP7 (available from Sumitomo Rubber Industries, Ltd.) excepting the compositions of the cap tread, the base tread, the side wall and the bead apex. The rolling resistance (RR) and the wet brake of this radial tire A are tested. Further, a rubber piece is cut out from the cap tread and the tan δ peak temperature of the piece is measured.

The composition and the tan δ peak temperature (Tp (° C.)) of the cap tread and the test results of the radial tire A are shown in Table 2.

Radial tires B, C and D are produced in the same process as the above-described process using the same composition for the cap tread rubber except that the rubber component and the carbon black component are changed as shown in Table 2. The tan δ peak temperatures of the respective cap treads and the rolling resistances and the wet brakes of the respective radial tires are tested. The results are shown in Table 2.

The radial tire D is that having a standard wet grip characteristic. The test results of the rolling resistance and the wet brake of the other radial tires than the radial tire D are shown in relative values (indices) to that of the radial tire D.

Table 2 shows that when the tan δ peak temperature of the cap tread after vulcanization is lower than −30° C., the wet grip becomes worse while the rolling resistance is lowered.

PRODUCTION EXAMPLE 2

Base tread

A base tread rubber composition is prepared by kneading a mixture of 70 parts of natural rubber, 30 parts of butadiene rubber (BR), 15 parts of a short fiber (a short fiber component in UBEPOL-HE 0100), 10 parts of FEF, 5 parts of an aromatic oil, 3 parts of a phenol resin, 1.5 parts of a wax, 2 parts of rubber antioxidant 6PPD, 2 parts of stearic acid, 4 parts of zinc oxide, 2 parts of sulfur and 1.3 parts of accelerator CZ, with a banbury mixer. Also, a cap tread rubber composition is prepared using the composition described in Table 1. When no short fiber is blended or the short fiber is oriented in the peripheral direction of the tire, above-described rubber compositions are co-extruded so that upper layer is the cap tread composition and lower layer is the base tread composition, to obtain a tread of cap tread/base tread 2-layer structure. When the short fiber is oriented in the axial direction of the tire, a cap tread is extruded, separately therefrom, a base tread is cut out from a calendered sheet, and they are pasted together in forming. Using this tread and the side walls and the bead apexes of which respective compositions are shown in Table 1, forming and vulcanization are carried out to obtain a radial tire (A) (185/65R14). The radial tire (A) corresponds to DUNLOP SP7 (available from Sumitomo Rubber Industries, Ltd.) except the cap tread, the base tread, the side wall and the bead apex. The rolling resistance (RR) and the steering stability (handle responsibility) of this radial tire (A) are tested.

The composition of the base tread rubber and the orienting direction of the short fiber in the base tread and the test results of the radial tire (A) are shown in Table 3.

Radial tires (B) to (I) are produced in the same process as the above-described process using the same composition for the base tread rubber except that the rubber component, the carbon black component and the short fiber component and the orienting direction of the short fiber are changed as shown in Table 3. Here, the iodine adsorption numbers of the respective carbon blacks are as follows: FEF; 43 mg/g, HAF; 82 mg/g, ISAF; 121 mg/g. ISAF is not a carbon black which is used in the present invention. The rolling resistances and the steering stability (handle responsibility) of the respective radial tires are tested. The results are shown in Table 3.

The radial tire (B) is that having a standard rolling resistance and steering stability. The test results of the rolling resistance and the steering stability (handle responsibility) of the other radial tires than the radial tire (B) are shown in relative values (indices) to that of the radial tire (B).

TABLE 2

|  | A | B | C | D |
|---|---|---|---|---|
| SBR*[1] | 60 | 60 | — | — |
| SBR*[2] | — | — | 60 | 50 |
| SBR*[3] | — | — | — | 35 |
| NR | 40 | 40 | 40 | 15 |
| N351 | 60 | 55 | — | 60 |
| SAF | — | — | 42 | — |
| Tp(°C.) | −40 | −43 | −32 | −24 |
| RR (index) | 83 | 81 | 91 | 100 |
| Wet brake (index) | 92 | 91 | 98 | 100 |

*[1]Solution-polymerized SBR: bonded styrene content is 15% by weight, vinyl content is 30% by mole
*[2]Solution-polymerized SBR: bonded styrene content is 15%, by weight vinyl content is 57% by mole
*[3]Solution-polymerized SBR: bonded styrene content is 29% by weight, vinyl content is 40% by mole

TABLE 3

|  | (A) | (B) | (C) | (D) | (E) | (F) | (G) | (H) | (I) |
|---|---|---|---|---|---|---|---|---|---|
| NR*[2] | 70 | 70 | 70 | 70 | 70 | 70 | 70 | 70 | 70 |
| BR | 30 | 30 | 30 | 30 | 30 | 30 | 30 | 30 | 30 |
| FRR*[1] | 15 | — | 25 | 15 | 15 | 6 | 15 | 15 | 15 |

TABLE 3-continued

|  | (A) | (B) | (C) | (D) | (E) | (F) | (G) | (H) | (I) |
|---|---|---|---|---|---|---|---|---|---|
| Orienting direction | Axial direction | — | Axial direction | Axial direction | Axial direction | Axial direction | Axial direction | Axial direction | Peripheral direction |
| FEF | 10 |  | 10 | 25 |  | 10 | 35 |  | 10 |
| HAF |  | 35 |  |  | 10 |  |  |  |  |
| ISAF |  |  |  |  |  |  |  | 10 |  |
| RR | 93 | 100 | 95 | 97 | 98 | 91 | 103 | 105 | 93 |
| Steering stability (handle responsibility) | 3.5 | 3 | 3.5 | 3+ | 3.5+ | 2.5 | 3.5 | 3.5+ | 2.5 |

*[1]Short fiber component in UBEPOL-HE 0100
*[2]Natural rubber in UBEPOL-HE 0100 is included.

Table 3 shows the following facts: FEF imroves the steering stability more than HAF; when the short fiber content is lower than 10 parts, the steering stability is lowered; when the carbon black content is higher than 30 parts, the rolling resistance becomes worse (increases); when the iodine adsorption number of the carbon black is higher than 90 mg/g, the rolling resistance becomes worse; when the orienting direction of the short fiber is the peripheral direction of the tire, the steering stability (handle responsibility) becomes worse.

PRODUCTION EXAMPLE 3

Side Wall

A side wall rubber composition is prepared by kneading a mixture of 45 parts of natural rubber, 55 parts of butadiene rubber, 15 parts of a short fiber (short fiber component in UBEPOL-HE 0100), 20 parts of FEF, 5 parts of an aromatic oil, 2 parts of a wax, 3 parts of rubber antioxidant 6PPD, 2 parts of stearic acid, 3 parts of zinc oxide, 1.5 parts of sulfur and 1 parts of accelerator CZ, with a banbury mixer. The rubber composition is extruded into a prescribed form by an extruder to obtain a side wall. Using the obtained side walls and, the cap tread, the base tread and the bead apexes of which respective compositions are shown in Table 1, forming and vulcanization are carried out to obtain a radial tire (1) (185/65R14). The radial tire (1) corresponds to DUNLOP SP7 (available from Sumitomo Rubber Industries, Ltd.) except the cap tread, the base tread, the side wall and the bead apex. The rolling resistance (RR) and the steering stability (handle responsibility) of this radial tire (1) are tested.

The composition of the side wall rubber and the orienting direction of the short fiber in the side wall and the test results of the radial tire (1) are shown in Table 4.

Radial tires (2) to (8) are produced in the same process as the above-descried process using the same composition for the side wall rubber except that the rubber component, the carbon black component and the short fiber component and the orienting direction of the short fiber are changed as shown in Table 4. The rolling resistances and the steering stabilities (handle responsibilities) of the respective radial tires are tested. The results are shown in Table 4.

The radial tire (4) is that having a standard rolling resistance and steering stability. The test results of the rolling resitance and the steering stability (handle responsibility) of the other radial tires than the radial tire (4) are shown in relative values (indices) to that of the radial tire (4).

TABLE 4

|  | (1) | (2) | (3) | (4) | (5) | (6) | (7) | (8) |
|---|---|---|---|---|---|---|---|---|
| NR*[2] | 45 | 45 | 45 | 45 | 45 | 45 | 45 | 45 |
| BR | 55 | 55 | 55 | 55 | 55 | 55 | 55 | 55 |
| FRR*[1] | 15 | 15 | 15 | — | — | 10 | 20 | 5 |
| Orienting direction | Peripheral direction | Peripheral direction | Axial direction | — | — | Peripheral direction | Peripheral direction | Peripheral direction |
| FEF block | 20 | 10 | 20 | 50 | 40 | 20 | 10 | 30 |
| RR | 95 | 95 | 100 | 100 | 95 | 99 | 100 | 100 |
| Handle responsibility | 3.5 | 3+ | 2.5 | 3 | 2.5 | 3 | 3.5 | 3− |
| Ride comfort | 3+ | 3.5 | 3 | 3 | 3.5 | 3+ | 3 | 3 |

*[1]Nylon short fiber component in UBEPOL-HE 0100
*[2]Natural rubber in UBEPOL-HE 0100 is included.

Table 4 shows that when the short fiber is oriented in the axial direction of the tire, the steering stability (handle responsibility) becomes worse. The radial tire (8) is somewhat inferior in the reference tire (4) in the handle responsibility since the amount of the short fiber is as small as 5 parts.

PRODUCTION EXAMPLE 4

Bead apex

A bead apex rubber composition is prepared by kneading a mixture of 100 parts of natural rubber, 30 parts of a short fiber (a short fiber component in UBEPOL-HE 0100), 70 parts of HAF, 15 parts of PR12686-resin (thermosetting resin) (available from Sumitomo Dyurez Kabushiki Kaisha), 3 parts of a phenol resin (tackifier), 2 parts of stearioc acid, 5 parts of zinc oxide, 3 parts of sulfur, 3.8 parts of accelerator CZ and 0.4 parts of Retarda PVI, with a bandary mixer. The rubber composition is extruded into a prescribed form by an extruder to obtain a bead apex. Using the obtained bead apexes and, the cap tread, the base tread and the side walls of which respective compositions are shown in Table 1, forming and vulcanization are carried out to obtain a radial tire ① (185/65R14). The radial tire ① corresponds to DUNLOP SP7 (available from Sumitomo Rubber Industries, Ltd.) except the cap tread, the base tread, the side wall and the bead apex. The rolling resistance and the steering stability (handle responsibility) of this radial tire ① are tested.

The composition of the bead apex rubber and the orienting direction of the short-fiber in the bead apex and the test results of the radial tire ① are shown in Table 5.

Radial tires ② and ③ are produced in the same process as the above-described process using the same composition for the bead apex rubber except that the rubber component, the carbon black component and the short fiber composition and the orienting direction of the short fiber are changed as shown in Table 5. The rolling resistances and the steering stabilities (handle responsibilities) of the respective radial tires are tested. The results are shown in Table 5.

The radial tire ③ is that having a standard rolling resistance and steering stability. The test results of the rolling resistance and the steering stability of the other radial tires than the radial tire ③ are shown in relative values (indices) to that of the radial tire ③.

TABLE 5

|  | ① | ② | ③ |
| --- | --- | --- | --- |
| NR*3 | 100 | 100 | 100 |
| FRR*1 | 30 | 30 | — |
| Orienting direction | Axial direction | Cross direction (±45°) | — |
| HAF | 70 | 70 | 70 |
| Thermosetting resin*2 | 15 | 15 | 15 |
| RR | 100 | 100 | 100 |
| Handle responsibility | 3+ | 3.5 | 3 |

*1Nylon short fiber component in UBEPOL-HE 0100
*2PR12686-resin
*3Natural rubber in UBEPOL-HE 0100 is included Table 5 shows that when the short fiber is oriented in the bead apex in the axial direction or a direction which crosses the axial direction of the tire, the steering stability (handle responsibility) is improved.

EXAMPLE 1

Using composition $T_B$ for the cap tread shown in Table 6, kneading and extrusion are carried out to obtain a cap tread. Here, the iodine adsorption number of carbon black N-351 is 68 mg/g. The tan δ peak temperature of the cap tread rubber is measured to find it is −24° C.

Using composition $B_B$ for the base tread shown in Table 6, kneading and extrusion are carried out to obtain a base tread.

Using composition $S_B$ for the side wall shown in Table 6, kneading and extrusion are carried out to obtain a side wall.

Using composition $A_B$ for the bead apex shown in Table 6, kneading and extrusion are carried out to obtain a bead apex.

Using the obtained cap tread, base tread, side walls and bead apexes, forming and vulcanization are carried out to obtain a radial tire (185/65R14). The radial tire corresponds to DUNLOP SP7 (available from Sumitomo Rubber Industries, ltd.) except those four construction parts. The short fiber is oriented in the axial direction in the base tread, in the peripheral direction in the side wall, and in the axial direction in the bead apex. Construction of the obtained tire is summarized in Table 7.

This radial tire is weighed, and the rolling resistance, the grip characteristic (steering stability), the handle responsibility (steering stability) and the ride comfort of the tire are tested.

The results are shown in Table 7.

Sizes of the respective construction parts are shown in Table 8.

EXAMPLES 2 AND 3

The same tire is obtained in the same manner as in EXAMPLE 1 except that compositions for the cap tread, for the base tread, for the side wall and for the bead apex shown in Table 7 are used. The same tests as those of EXAMPLE 1 are carried out on the obtained tire. The results are shown in Table 7. Sizes of the respective construction parts are shown in Table 8.

COMPARATIVE EXAMPLES 1 to 3

The same radial tires as those of EXAMPLE 1 are obtained, except that compositions shown in Table 6 and constructions shown in Table 7 are used.

These radial tires are weighed and the rolling resistances, the grip characteristics, the handle responsibilities and the ride comforts of the tires are tested. The results are shown in Table 7.

The radial tire of COMPARATIVE EXAMPLE 3 is that having a standard rolling resistance. The test results of the rolling resistance of the other radial tires than the radial tire of COMPARATIVE EXAMPLE 3 are shown in relative values (indices) to that of the radial tire of COMPARATIVE EXAMPLE 3.

Sizes of the respective construction parts are shown in Table 8.

TABLE 6

|  | Composition for cap tread | | | Composition for base tread | | Composition for side wall | | | Composition for bead apex | |
| --- | --- | --- | --- | --- | --- | --- | --- | --- | --- | --- |
|  | $T_A$ | $T_B$ | $T_C$ | $B_A$ | $B_B$ | $S_A$ | $S_B$ | $S_C$ | $A_A$ | $A_B$ |
| NR*10 | 40 | 15 | 40 | 60 | 60 | 45 | 45 | 45 | 100 | 100 |
| BR | — | — | — | 40 | 40 | 55 | 55 | 55 | — | — |
| SBR*1 | 30 | 50 | — | — | — | — | — | — | — | — |
| SBR*2 | 30 | — | — | — | — | — | — | — | — | — |
| SBR*3 | — | — | 60 | — | — | — | — | — | — | — |
| SBR*4 | — | 35 | — | — | — | — | — | — | — | — |

TABLE 6-continued

|  | Composition for cap tread | | | Composition for base tread | | Composition for side wall | | | Composition for bead apex | |
|---|---|---|---|---|---|---|---|---|---|---|
|  | $T_A$ | $T_B$ | $T_C$ | $B_A$ | $B_B$ | $S_A$ | $S_B$ | $S_C$ | $A_A$ | $A_B$ |
| FRR*5 | — | — | — | — | 15 | — | 15 | — | — | 30 |
| FEF*6 | — | — | — | — | 10 | 40 | 20 | 50 | — | — |
| N-351*7 | 45 | 60 | 45 | — | — | — | — | — | — | — |
| HAF*8 | — | — | — | 35 | — | — | — | — | 70 | 70 |
| Thermosetting resin*9 | — | — | — | — | — | — | — | — | 15 | 15 |
| Aromatic oil | — | 20 | 0 | 5 | — | 5 | — | — | — | — |
| Phenol resin (Tackifier) | — | — | — | 3 | — | — | — | — | 3 | — |
| Wax | 1.5 | 1.5 | 1.5 | 1.5 | — | 2 | — | — | — | — |
| Rubber antioxidant 6PPD | 1.5 | 1.5 | 1.5 | 2 | — | 3 | — | — | — | — |
| Stearic acid | 2 | 2 | 2 | 2 | — | 2 | — | — | 2 | — |
| Zinc oxide | 3 | 3 | 3 | 4 | — | 3 | — | — | 5 | — |
| Sulfur | 1.75 | 1.75 | 1.75 | 2 | — | 1.5 | — | — | 3 | — |
| Accelerator CZ | 1.0 | 1.0 | 1.0 | 1.3 | — | 1 | — | — | 3.8 | — |
| Retarda PVI | — | — | — | — | — | — | — | — | 0.4 | — |

*1Solution-polymerized SBR: bonded styrene content is 15% by weight, vinyl conetns is 57% by mole.
*2Solution-polymerized SBR: bonded styrene content is 15% by weight, vinyl conetns is 45% by mole.
*3Solution-polymerized SBR: bonded styrene content is 21% by weight, vinyl conetns is 63% by mole.
*4Solution-polymerized SBR: bonded styrene content is 29% by weight, vinyl conetns is 40% by mole.
*5Nylon short-fiber component in UBEPOL-HE 0100
*6Iodine adsorption number is 43 mg/g.
*7Iodine adsorption number is 68 mg/g.
*8Iodine adsorption number is 82 mg/g.
*9PR12686 resin
*10Natural rubber in UBEPOL-HE 0100 is included.

TABLE 7

|  |  | Example 1 | Comparative Example 1 | Comparative Example 2 | Comparative Example 3 | Example 2 | Example 3 |
|---|---|---|---|---|---|---|---|
| Cap tread | composition | $T_B$ directed to grip | $T_A$ directed to LRR | $T_A$ directed to LRR | $T_B$ directed to grip | $T_C$ directed to grip | $T_C$ directed to grip |
|  | tan δ peak temperature (°C.) | −24 | −35 | −35 | −24 | −12 | −12 |
| Base tread | composition | $B_B$ | $B_A$ | $B_B$ | — | $B_B$ | $B_B$ |
|  | iodine adsorption number (mg/g) | 43 | 82 | 43 | — | 43 | 43 |
|  | phr | 10 | 35 | 10 | — | 10 | 10 |
|  | orienting direction of short fiber | axial direction | — | axial direction | — | axial direction | axial direction |
|  | phr | 15 | — | 15 | — | 15 | 15 |
| Side wall | composition | $S_B$ | $S_A$ | $S_B$ | $S_C$ | $S_B$ | $S_B$ |
|  | iodine adsorption number (mg/g) | 43 | 43 | 43 | 43 | 43 | 43 |
|  | phr | 20 | 40 | 20 | 50 | 20 | 20 |
|  | orienting direction of short fiber | peripheral direction | — | peripheral direction | — | peripheral direction | peripheral direction |
|  | phr | 15 | — | 15 | — | 15 | 15 |
| Bead apex | composition | $A_B$ | $A_A$ | $A_B$ | $A_A$ | $A_B$ | $A_B$ |
|  | iodine adsorption number (mg/g) | 82 | 82 | 82 | 82 | 82 | 82 |
|  | phr | 70 | 70 | 70 | 70 | 70 | 70 |
|  | orienting direction of short fiber | axial direction | — | axial direction | — | axial direction | cross direction |
|  | phr | 30 | — | 30 | — | 30 | 30 |
| Weight (g) |  | 6.0 | 6.0 | 6.0 | 8.0 | 6.0 | 6.0 |
| RR |  | 63 | 64 | 60 | 100 | 64 | 64 |
| Grip characteristic |  | 3 | 2.5 | 2.5 | 3 | 3.5 | 3.5 |
| Handle responsibility |  | 3 | 2.7 | 2.9 | 3 | 3+ | 3.5 |
| Ride comfort |  | 3 | 2.9 | 3 | 3 | 3 | 3+ |

TABLE 8

|  | Example 1 | Example 2 | Example 3 | Comparative Example 1 | Comparative Example 2 | Comparative Example 3 |
|---|---|---|---|---|---|---|
| Thickness of tread (mm) | 10 | 10 | 10 | 10 | 10 | 10 |
| Thickness of side wall (mm) | 1.5 | 1.5 | 1.5 | 2.5 | 1.5 | 3.5 |

TABLE 8-continued

|  | Example 1 | Example 2 | Example 3 | Comparative Example 1 | Comparative Example 2 | Comparative Example 3 |
|---|---|---|---|---|---|---|
| Height of bead apex (mm) | 25 | 25 | 25 | 30 | 25 | 45 |

In Table 6, $T_A$, $B_A$, $S_A$, $S_C$, $A_A$ are conventional ordinary compositions.

From the results of EXAMPLES 1 to 3 and COMPARATIVE EXAMPLES 1 to 3, following facts are recognized. The radial tires according in the present invention are light, have very low rolling resistances, can provide excellent steering stabilities and ride comforts.

As explained above, since the radial tire according in the present invention is light and has a low rolling resistance, the car mounted with the tires is improved in the fuel consumption. Further, since the tire has an excellent steering stability (grip characteristic, handle responsibility), the tire can ensure a safe high speed driving and also can provide an excellent ride comfort.

What we claim is:

1. A radial tire comprising
   (A) a cap comprising a rubber composition which has a tan δ peak temperature measured after vulcanization of not less than −30° C.,
   (B) a base tread comprising a rubber composition containing, per 100 parts by weight of a rubber component, not more than 30 parts by weight of a carbon black which has an iodine adsorption number of from 30 to 90 mg/g and not less than 10 parts by weight of first short fibers, the first short fibers being oriented in the substantially axial direction of the tire,
   (C) a side wall extending between a bead portion and the base tread, said side wall comprising a rubber composition containing, per 100 parts by weight of a rubber component, not more than 30 parts by weight of a carbon black which has an iodine adsorption number of from 30 to 90 mg/g and not less than 10 parts by weight of second short fibers, the second short fibers being oriented in the peripheral direction of the tire, and
   (D) a bead apex comprising a rubber composition containing, per 100 parts by weight of a rubber component, not less than 65 parts by weight of a carbon black which has an iodine adsorption number of from 60 to 100 mg/g and not less than 20 parts by weight of third short fibers, the third short fibers being oriented in the substantially axial direction of the tire or a direction which crosses the substantially axial direction, said direction being at a crossing angle to the substantially axial direction in a range of from 30 to 60 degrees.

2. The radial tire of claim 1 wherein at least one of the first short fibers, second short fibers and third short fibers have an average diameter of 0.3 μm and an average length of 300 μm.

* * * * *